United States Patent

Engelhardt et al.

[11] Patent Number: 5,861,592
[45] Date of Patent: Jan. 19, 1999

[54] RESET DEVICE FOR TURN SIGNAL RESET SWITCH WITH TRIGGER FINGER TENSIONED BY A COMPRESSION SPRING

[75] Inventors: Martin Engelhardt, Weinsberg; Martin Laich, Backnang, both of Germany

[73] Assignee: ITT Automotive Europe GmbH, Germany

[21] Appl. No.: 737,843
[22] PCT Filed: May 6, 1995
[86] PCT No.: PCT/EP95/01727
    § 371 Date: Feb. 7, 1997
    § 102(e) Date: Feb. 7, 1997
[87] PCT Pub. No.: WO95/32876
    PCT Pub. Date: Dec. 7, 1995

[30] Foreign Application Priority Data

May 26, 1994 [DE] Germany .................. 44 18 328.3

[51] Int. Cl.⁶ ............................................. H01H 3/16
[52] U.S. Cl. ............................... 200/61.3; 200/61.34
[58] Field of Search .................. 200/61.27, 61.3–61.36, 200/61.54

[56] References Cited

U.S. PATENT DOCUMENTS

| | | | |
|---|---|---|---|
| 3,796,846 | 3/1974 | Wilkinson et al. | 200/61.27 |
| 4,149,048 | 4/1979 | Winter et al. | 200/61.54 |
| 4,315,117 | 2/1982 | Kokubu et al. | 200/61.27 |
| 4,570,041 | 2/1986 | Ishiguro | 200/61.54 |
| 5,030,802 | 7/1991 | Noro | 200/61.27 |

FOREIGN PATENT DOCUMENTS

| | | | |
|---|---|---|---|
| 2280529 | 2/1976 | France | B60Q 1/42 |
| 2128881 | 12/1972 | Germany | B60Q 1/34 |
| 2201157 | 12/1973 | Germany | B60Q 1/34 |
| 4219393 | 11/1993 | Germany | B60Q 1/42 |

OTHER PUBLICATIONS

Search Report of the German Patent Office for Application P4418328.3.
English Translation of the International Preliminary Examination Report for PCT/EP95/01727.

Primary Examiner—Michael L. Gellner
Assistant Examiner—Michael A. Friedhofer
Attorney, Agent, or Firm—Thomas N. Twomey; J. Gordon Lewis

[57] ABSTRACT

A reset device for a blinker switch includes a pivoting reset element which is used which has two lateral arms on which opposing springs extending through the switch housing act. These springs both tension the reset element with respect to the steering spindle and produce a torque tending to restore the reset element to its middle setting. The problem of the invention is to do without the conventional draw springs. The invention solves this problem by means of a single compression spring acting on the reset element and providing both a force in the longitudinal direction of the reset element and the desired restoring torque.

5 Claims, 1 Drawing Sheet

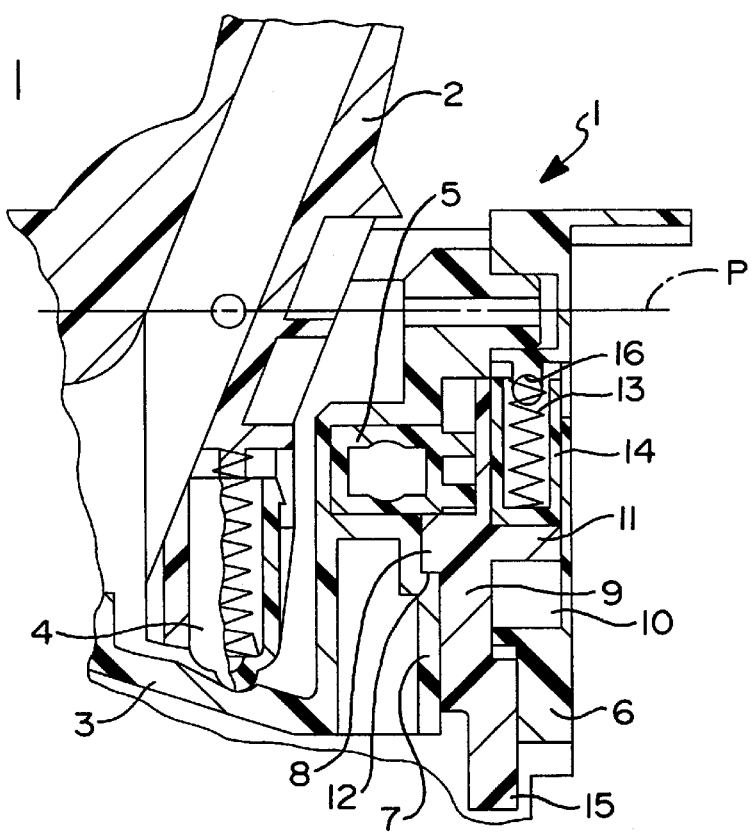
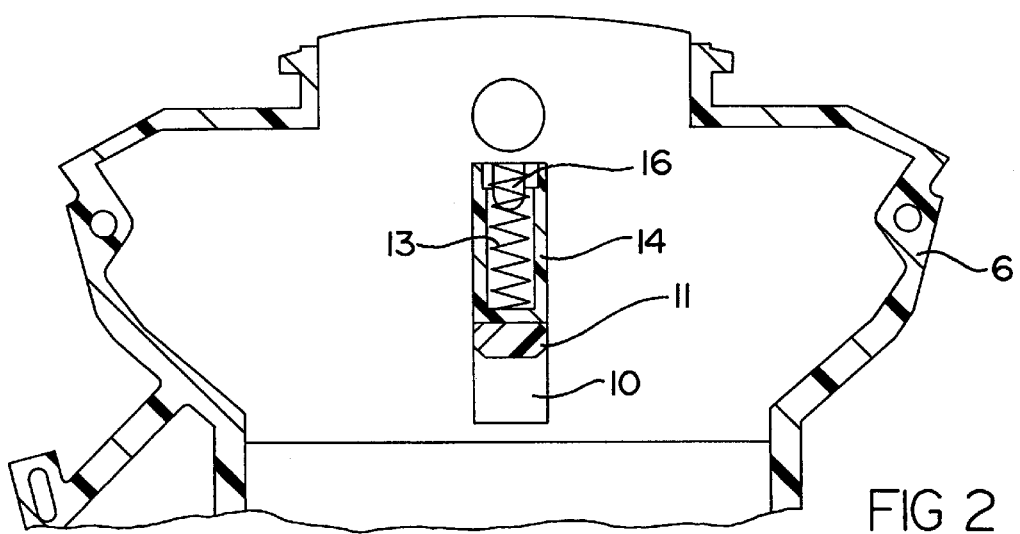

RESET DEVICE FOR TURN SIGNAL RESET SWITCH WITH TRIGGER FINGER TENSIONED BY A COMPRESSION SPRING

TECHNICAL FIELD

The invention pertains to a reset device with overshift protection for a turn signal reset switch in motor vehicles.

DETAILED DESCRIPTION OF THE PREFERRED EMBODIMENTS

Turn signal reset switches of this kind are located near the steering wheel on the steering column and the automatic reset from one of the two switched-on settings into the neutral middle setting takes place by means of a trigger finger located on the switch, and extending into the circular path of a cam located on the steering spindle.

A reset device of this kind is known, for example, from DE-PS 2,826,597. A similar unit is also described in DE-OS 3,502,650 and also in DE-PS 2,914,742.

For all these known systems, it is important that the trigger finger be tensioned against the steering spindle, and also that it be aligned by spring force in its standard position, with the trigger finger pointing toward the steering spindle in the standard position.

In the reset device described in DE-PS 3,502,650 and also in all the other above-referenced devices, the trigger finger is tensioned in such a manner that two coil springs, attached to one end of it at the switch housing, engage symmetrically in two lateral lugs of the trigger finger. Both springs having a common force component toward the steering column, whereas the torque exerted by both springs jointly onto the trigger finger tends to pull it into its standard position.

A disadvantage in the known reset devices is that the two springs acting on the trigger finger tend to make noise and are comparatively bulky, since they extend through a significant region of the interior of the housing. In addition, the attachment of the four ends of these springs requires an additional effort which cannot be automated, in particular, when the accidental release of one of these springs from one of the mounting points is to be dependably prevented.

Therefore, it is the purpose of the invention to specify a reset unit of the kind specified above, which is of simple design and does not need the reset devices described above nor the two tension springs acting in opposite directions and constructed as draw springs.

The present invention does not use the aforementioned two draw springs, but instead uses a single compression spring, which will also act with a flat contact surface on the flat contact surface of the guide lug. The added advantage of the present invention is that the guide lug is always tensioned against the steering spindle. On the other hand, care is taken that in a pivot movement of the trigger finger—due to the simultaneously pivoted contact surface of the trigger finger against the flat contact surface of the spring—the spring's point of contact is moved from the middle line of the trigger finger and thus an additional torque is applied by the compression spring, which attempts to return the trigger finger into its standard position.

In order to ensure that the contact surface for the guide lug is as large as possible with respect to the spring, and on the other hand, in order not to prevent a potential pivot motion of the guide finger, in a refinement of the invention the guide lug 11 is square having side surfaces adjoining the lateral groove walls 10 having an arc-shaped contour. This further allows the side surfaces of the guide lug to engage, on the one hand, essentially in a line with the side surfaces of the longitudinal groove. On the other hand, due to the arc-like contour of the side surfaces, a pivot motion of the trigger finger will not be prevented.

In order to make the contact surface of the spring as large as possible with respect to the guide lug and thus to obtain the greatest possible torque for a specified groove width during a pivot motion of the trigger finger, in a refinement of the invention, the radius of the side surface is curved like an arc sector is smaller than or equal to one-half the width of groove 10. Accordingly, the contour of the guide lug coincides with sections of a circle whose circumference is in contact with the side walls of the groove.

In order to achieve a standard position of the trigger finger aligned precisely with the middle of the steering spindle, in a refinement of the invention the end of the spiral spring facing the guide lug 11 is flat. Accordingly, preferably the end of the spiral spring facing the trigger finger is ground off smooth, so that a ring-shaped contact surface of the spring lying in a plane will be obtained on the guide lug.

Now in order to prevent the edges of the spring from damaging the plane of the guide lug and in order to improve the contact surface of the spring with respect to the guide lug, in a refinement of the invention the end region of spiral spring 13 facing the guide lug is held in a casing 14 run in the longitudinal groove 10 which has a base surface pointing to the guide lug. Accordingly, the end of the spring facing the guide lug does not act directly on the guide lug, but rather by means of a casing, so that the spring forces are distributed uniformly onto a surface.

One particularly simple design for the casing is that the casing is made of plastic and runs through the side walls of the longitudinal groove. In this case, due to the casing it will also be assured that the spring cannot slip out in any manner. As was explained farther above, the end of the spring turned away from the guide lug is braced directly against the switch housing or against a fixed-position component opposite the switch housing. Now in order to prevent the end braced against the housing from slipping off to the side due to the forces acting on the spring, a pin is used.

The present description makes express reference to the state of the art disclosed above and in particular to DE-OS 3,502,650. Therefore, the figures will explain the components only to the extent necessary in conjunction with DE-OS 3,502,650.

BRIEF DESCRIPTION OF THE DRAWINGS

FIG. 1 is a partial and cut-away representation of a section from a reset device.

FIG. 2 is a cross section along line A through the reset device according to FIG. 1.

DETAILED DESCRIPTION OF THE PREFERRED EMBODIMENTS

FIG. 1 shows a portion of a switch lever 2 which is securely attached to a switching element 3. The switch lever 2 is braced elastically against the switching element 3 by means of a spring casing 4. In a pivot motion of the switch lever 2 about the pivot axis P, the switching element 3 pivots about a corresponding angle.

Within the switching element 3 there are two slide elements 5 which can slide transversely in reference to the plane of the paper and are kept apart by the force of an installed compression spring 19. The slide elements are braced against a catch contour 20 by means of moving catch elements 21 at the housing 6.

The switching element 3 features a triangular protrusion 7 and a protrusion 8 of the reset element 9 is braced against it. The reset element 9 can slide within and pivot in a longitudinal groove 10 of the housing 6 when a guide lug 11 engages in the groove.

In the symmetrical position of the reset element 9 illustrated in FIG. 1, this element rests with its protrusion 8 on the pointed edge 12 of the triangular protrusion. Thus, a coil spring 13 exerts a downward force onto the guide lug 11 by means of a casing 14 with the base surface of this casing 14. Now, if the protruding triangle 7 is pivoted toward or away from an observer due to a pivot movement of the switch lever 2, then the point of contact 12 of the protrusion 8 is shifted downward from the lateral edge of the triangular protrusion 7, so that, due to the force of the spring 13, the reset element 9 moves downward by an amount specified by the pivot motion of the switch lever 2. This causes a trigger finger 15 at the lower end of the reset element 9 to arrive at the engaging area of a cam 17 on the steering spindle 18. Now, as is explained in detail in the state of the art reference above, there are two possible sequences. If the steering spindle 18 rotates in a first direction, then the reset element 9 will turn about the guide lug 11 until the cam 17 on the steering spindle 18 can pass the lower end of the trigger finger 15.

But if the steering spindle 18 rotates in the opposite direction, then the cam 17 engages in the trigger finger 15, whereupon the reset element engages in the slide piece 5 and releases it from its locked actuation position and thus returns it to its middle setting. This concludes the turn signal process and the turn signal lever is returned to its middle setting. It is important for the invention due to the action of the spiral spring 13 in conjunction with the casing 14, as is indicated in FIG. 2, not only to exert a downward force, but at the same time, also to apply a torque which attempts to bring the reset element 9 into its standard, middle position by means of the guide lug 11. For example, if the trigger finger is pivoted by the cam 17 of the steering spindle 18, then at the same time, the guide lug 11 is tilted against the base surface of the casing 14. Thus the casing engages eccentrically in the guide lug 11, which leads to a restoring torque. Thus in a simple manner, the function of the known, two tension springs is replaced by a single, spiral compression spring.

In order to simplify the rotation of the guide lug 11 in the groove 10 (see FIG. 2), the side surface of the guide lug 11 is of ball shape and preferably has a circular contour. The circular curvature should be selected so that the radius of curvature is only somewhat smaller than half the width of the groove. If it is larger, there is a danger of sticking; if it is smaller, then there will be free play in the pivot position. The large contact surface should be achieved by bringing the flat surface as close as possible to the plane of symmetry of the recess.

In order to prevent a lateral shifting of the end of the spring 13 turned away from the casing base of the casing 14 with respect to the housing 6, a pin 16 extends from the housing 6 into the end of the spring.

We claim:

1. A reset device with a switching cutout for a turn signal reset switch for use in motor vehicles, wherein the turn signal reset switch is located in a housing, said reset device including an automatic reset into a middle setting which takes place by means of a trigger finger located on the switch, wherein said trigger finger extends in a longitudinal direction perpendicular to a steering spindle and, upon actuation of the switch, engages a cam located on the steering spindle and is pretensioned against the steering spindle by spring force; wherein said trigger finger cooperates with a switching element which is pivoted about an axis parallel to the steering spindle and is equipped with a catch element engaging in a catch contour, comprising:

means for rotating said trigger finger wherein said rotating means is mounted so as to rotate in the housing of the switch an can be displaced therein in parallel to the longitudinal direction of the trigger finger, having a guide lug that extends into a groove in the housing, the groove extending in the longitudinal direction of the trigger finger and having a width, a spiral spring braced against the housing which acts in the longitudinal direction of the trigger finger on a contact surface of the guide lug and thus tensions the trigger finger, wherein the contact surface of the guide lug facing the spiral spring is a flat surface positioned vertical to the longitudinal direction of the trigger finger.

2. The reset device according to claim 1, wherein the guide lug is essentially a square having side surfaces with arc-shaped contours.

3. The reset device according to claim 2, wherein the arc-shaped contours have a radius smaller than or equal to half the width of the groove.

4. The reset device according to claim 2, wherein the spiral spring facing the guide lug is at least partially held in a casing run in the groove.

5. The reset device according to claim 1, wherein a pin, which secures the spiral spring against a lateral movement, extends from the housing in the direction in which the groove extends.

* * * * *